United States Patent
Katz

(10) Patent No.: US 7,119,678 B2
(45) Date of Patent: Oct. 10, 2006

(54) WIRELESS LIGHT SENSOR INPUT TO A SECURITY SYSTEM

(75) Inventor: Fred Katz, Hauppauge, NY (US)

(73) Assignee: Honeywell International, Inc., Morristown, NJ (US)

( * ) Notice: Subject to any disclaimer, the term of this patent is extended or adjusted under 35 U.S.C. 154(b) by 179 days.

(21) Appl. No.: 10/854,545

(22) Filed: May 26, 2004

(65) Prior Publication Data

US 2005/0264415 A1   Dec. 1, 2005

(51) Int. Cl.
G08B 1/08 (2006.01)
G08B 17/12 (2006.01)
G05B 11/01 (2006.01)
G01C 21/02 (2006.01)
G01C 1/42 (2006.01)

(52) U.S. Cl. .............. 340/539.26; 340/539.1; 340/539.11; 340/539.22; 340/539.26; 340/310.11; 340/310.16; 340/506; 340/538; 340/577; 340/600; 250/203.4; 250/208.02; 250/208.04

(58) Field of Classification Search .......... 340/538, 340/539.1, 539.11, 539.22, 539.26, 310.11, 340/506, 577, 600; 250/203.4, 208.02, 208.04
See application file for complete search history.

(56) References Cited

U.S. PATENT DOCUMENTS

| 6,028,522 A * | 2/2000 | Petite ................ 340/641 |
| 6,437,698 B1 * | 8/2002 | Byrne et al. .......... 340/630 |
| 6,559,760 B1 * | 5/2003 | Samejima et al. ...... 340/425.5 |
| 6,608,552 B1 * | 8/2003 | Fogel et al. .......... 340/310.11 |
| 6,759,643 B1 * | 7/2004 | Su et al. ............. 250/214 AL |

* cited by examiner

*Primary Examiner*—Thomas Mullen
*Assistant Examiner*—Lam Pham
(74) *Attorney, Agent, or Firm*—Scully, Scott, Murphy & Presser, P.C.

(57) ABSTRACT

The present invention relates to a system and method for the wireless light sensor input to a security system, wherein the light sensed by the light sensor is used to determine the activation and deactivation state of the security system. The system and method determine a light level threshold value and obtaining a light level value. Further, the obtained light level value is compared to a light level threshold value in order to determine if the present light level value is greater than or less than the light level threshold value, and finally, a signal is transmitted to a remote device in response to the comparison of the light level value.

14 Claims, 3 Drawing Sheets

WIRELESS LIGHT SENSOR INPUT TO A SECURITY SYSTEM

FIELD OF THE INVENTION

The present invention relates to the field of control devices that are utilized to activate, deactivate or control home, industrial or commercial security systems and the ancillary systems associated with therewith.

BACKGROUND OF THE INVENTION

Currently, security systems have the capability to control appliances and lamps remotely located throughout a property. "Experiment #10" remote command protocols (X-10 for short) are well known protocols for the utilization of power distribution lines for the transmission of command data between electric devices. X-10 was specifically developed as a protocol to provide an electronic, wireless method for the remote control of electronic equipment. The method operates by sending a data message over normal AC main power lines at a specific carrier frequency, whereby a device can be "commanded" to turn "on" or "off." However, devices that utilize X-10 technology cannot perform any other functions and thereby must be used in conjunction with other technological devices in order to provide additionally functionality to a system.

There is a need for a security system that differentiates between day and night in order to effectively activate applications that may be utilized in conjunction with the system for recognizing day and night modes.

The proposed invention will be used to send a signal to the control panel that indicates the presence of light, specifically sunlight. The invention is adjustable, so that the amount of light necessary to trigger the invention is adjustable. The control panel can be programmed to switch on either one or multiple controllers when the absence or presence of sunlight is indicated via the invention, wherein the controllers can utilize X-10 remote command protocols. In a home security environment the present invention, based upon the signals that are transmitted and received by way of the invention, can control a security system. Further, in an industrial or commercial environment, the status of day or night can be utilized by the present invention to activate or deactivate surveillance cameras, area illumination and control illuminated signs among other devices.

SUMMARY OF THE INVENTION

The present invention relates to a system and method for the wireless light sensor input to a security system, wherein the light sensed by the light sensor is used to determine the activation and deactivation state of the security system.

An embodiment of the present invention comprises a system for the wireless light sensor input to a security system. The system comprises a light sensor, the light sensor having a light detection means for detecting the change of states of light from light-to-dark and from dark-to-light. The light sensor also has a processor that is in electrical communication with the light detection means in addition to a wireless transmitter that is in electrical communication with the processor.

The system further comprises an alarm control panel that is in communication with the light sensor. The alarm control panel has a processor, a receiver in electrical communication with the processor, and a power line interface that is in electrical communication with the processor. The power line interface is coupled to a power distribution system.

At least one remote device controller is coupled to the power distribution system. The remote device controller is in electrical communication with the alarm control panel via the power distribution system. At least one remote device is coupled to the power distribution system, wherein the remote device is in electrical communication with the at least one remote device controller via the power distribution system.

A further embodiment of the present invention comprises a method for the wireless light sensor input to a security system. The method comprises the steps of determining a light level threshold value and obtaining a light level value. Further, the method compares the obtained light level value to the light level threshold value in order to determine if the present light level value is greater than or less than the light level threshold value and transmitting a signal to a remote device in response to the comparison of the light level value.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

Figure 1:
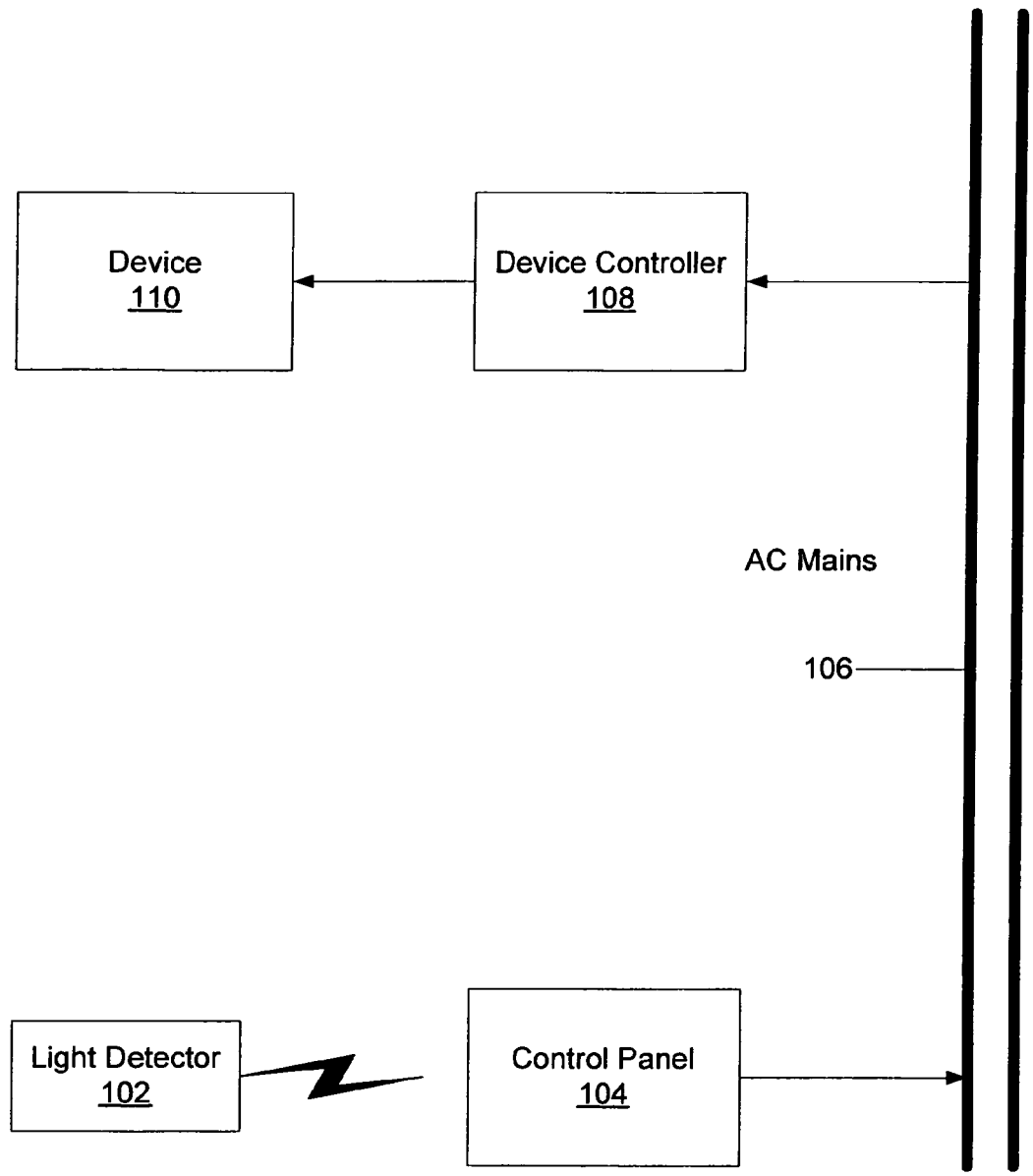
FIG. 1 is a diagram of an embodiment of the present invention.
Figure 1A:
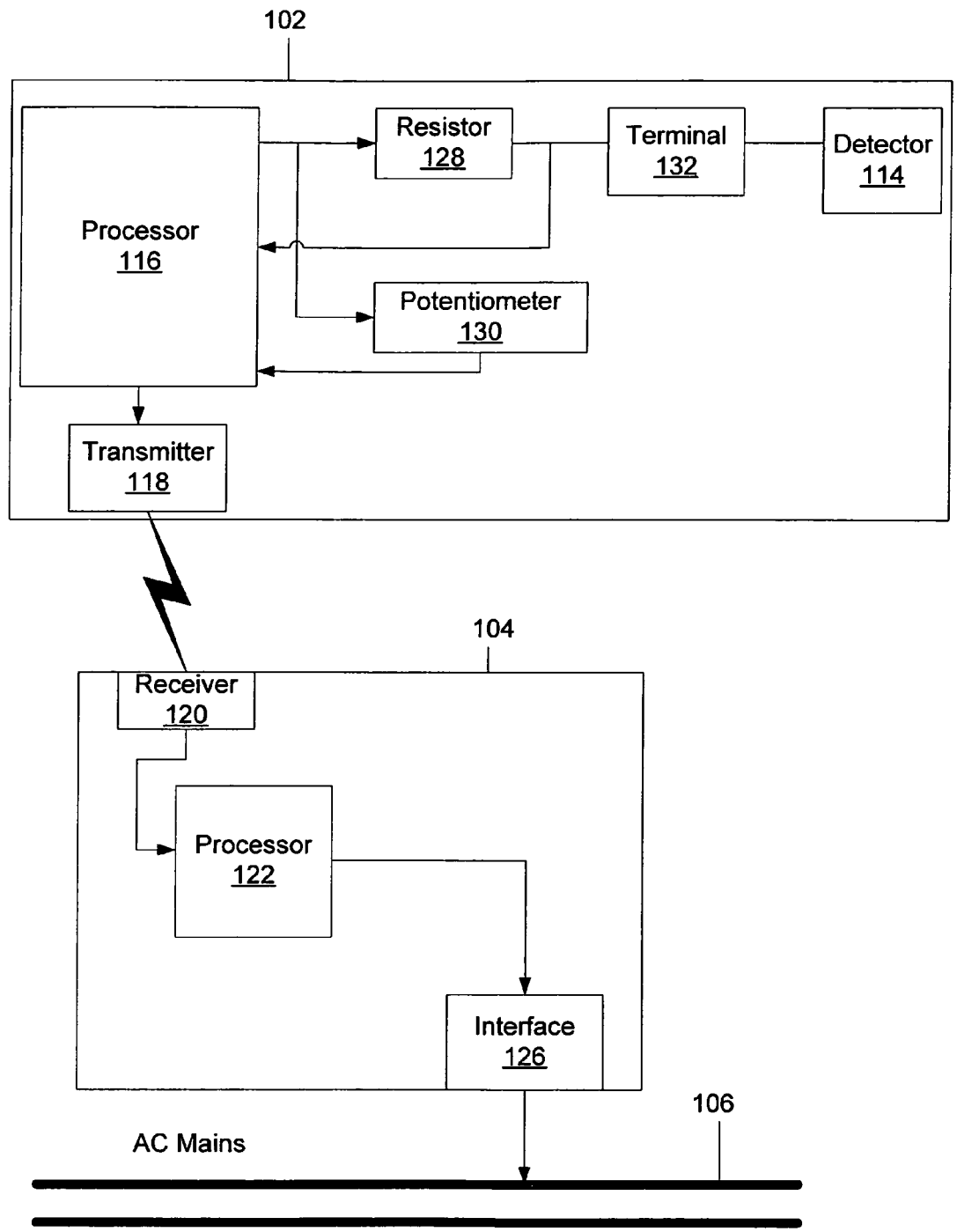
FIG. 1A is an embodiment of a light sensor and control panel of the present invention.

The present invention is initially described in reference to FIGS. 1 and 1A. FIGS. 1 and 1A show a system for the wireless light sensor input to a security system. The system has a light sensor 102, wherein the light sensor 102 comprises a light detection means 114 for detecting the ambient light level. The light detection means 114 may comprise, but is not limited to a phototransistor. A processor 116 is in electrical communication with the light detection means 114, and a wireless transmitter 118 is in electrical communication with the processor.

The system also has an alarm control panel 104 that is in communication with the light sensor 102, wherein the alarm control panel 104 comprises a processor 122 and a receiver 120 that is in electrical communication with the processor 122. Additionally, the control panel has a power line interface 126 that is in electrical communication with the processor 122. The power line interface 126 is coupled to the AC main power lines 106 of a power distribution system.

At least one remote device controller 108 is coupled to the power lines 106 of the power distribution system. The remote device controller 108 is also in electrical communication with the alarm control panel 104 via the power lines 106 of the power distribution system. At least one remote device 110 is coupled to the power distribution system 106, the remote device 110 being in electrical communication with the at least one remote device controller 108 via the AC main power lines 106 of the power distribution system.

The light sensor 102 and control panel are further detailed in FIG. 1A. A light detection means 114 is connected via a terminal block 132 to a current source. The processor 116 outputs a DC reference voltage to a resistor 128; thereby creating a current source whose output voltage is dependent upon the resistance of the load circuit. The light current that passes through the light detection means 114 determines the light detection means 114 equivalent resistance. The light detection means 114 resistance is inversely proportional to the amount of light falling upon the light detection means 114.

Therefore, when it is dark, almost no light current is generated by the light detection means 114, and summarily the output voltage is high. This output voltage is fed into an analog to digital converter (ADC) within the processor 116. In addition, a potentiometer 130 can be adjusted to render a voltage proportional to the potentiometer's 130 threshold setting, the voltage is fed into a second ADC channel of the processor 116. The processor 116 is usually in a sleep state, where it consumes minimal battery current. The processor 116 will occasionally activate in order to check the two ADC converter inputs.

Since the visual emission of light from the sun does not change very fast, sampling of the light can be done once per minute. Prior to checking the inputs, the processor 116 turns on the reference voltage output line that applies power to the light detection means 114 and the threshold potentiometer 130.

Periodic measurements are made of the light detection means 114 and potentiometer 130 voltages in order to determine if a change in the light level that is indicative of a light-to-dark state or a dark-to-light level has occurred. If it is determined that a change of state indicative of a light-to-dark or a dark-to-light transition has occurred, the processor 116 raises a gate voltage to turn on the transmitter 118. The processor 116 then transmits a data signal via the transmitter to the control panel 104, wherein the signal is indicative of the change of the light level; the signal being either a Fault or Restore signal.

The processor 116 of the light sensor 102 comprises a "Fault mode" switch (not shown). The Fault mode switch is a two-state switch that defines how the transmitter 118 will transmit a Fault signal that is generated within the system. The position of the Fault mode switch determines whether the transition to light or darkness will result in the generation of a fault signal. The Fault mode will turn on an external accessory and the Restore signal will deactivate an external accessory. Normally, the presence of light will result in the generation of a Fault signal, with the exception of when the Fault mode switch is set to invert the process, in that instance then darkness will generate a Fault signal.

The light level threshold value when the processor 116 switches between states, light-to-dark or dark-to-light, are adjustable by setting the position of the potentiometer 130. For example an offset light level threshold value is set at the potentiometer 130. When the light level value is determined to be lower than the light level threshold value then, a Fault signal is transmitted to the control panel 104. If it is determined that the light level threshold value power is greater than the light level threshold value, then a Restore signal is transmitted to the control panel 104. Thus, for light level values lower than the light level threshold value plus hysteresis, the light level is always indicative of a dark-to-light condition. Accordingly, for light level values higher than the light level threshold value, the light level value is always indicative of a light-to-dark state. A hysteresis model is applied as an offset between the values of the voltage threshold of light-to-dark or dark-to-light levels in order to prevent the invention from switching back and forth between light levels due to minor light level fluctuations.

Upon receiving a Fault signal, the alarm control panel 104 transmits a command signal via the power lines 106 of the power distribution system to the remote device controller 108 to activate the remote device 110. As previously mentioned, the controller 108 can be equipped with hardware that will enable it to transmit commands to the remote device controller 108, such as hardware that utilizes X-10 data command protocols. When the transmitted command is received at the remote device controller 108, the remote device controller transmits an activation or deactivation signal to the remote device 110, thereby, either activating or deactivating the remote device 110.

Similarly, upon receiving a Restore signal, the alarm control panel 104 transmits a command signal via the power lines 106 of the power distribution system to the remote device 110 to deactivate the remote device 110. When the transmitted command is received at the remote device controller 108, the remote device controller transmits a deactivation signal to the remote device 110, thereby, deactivating the remote device 110.

Figure 2:
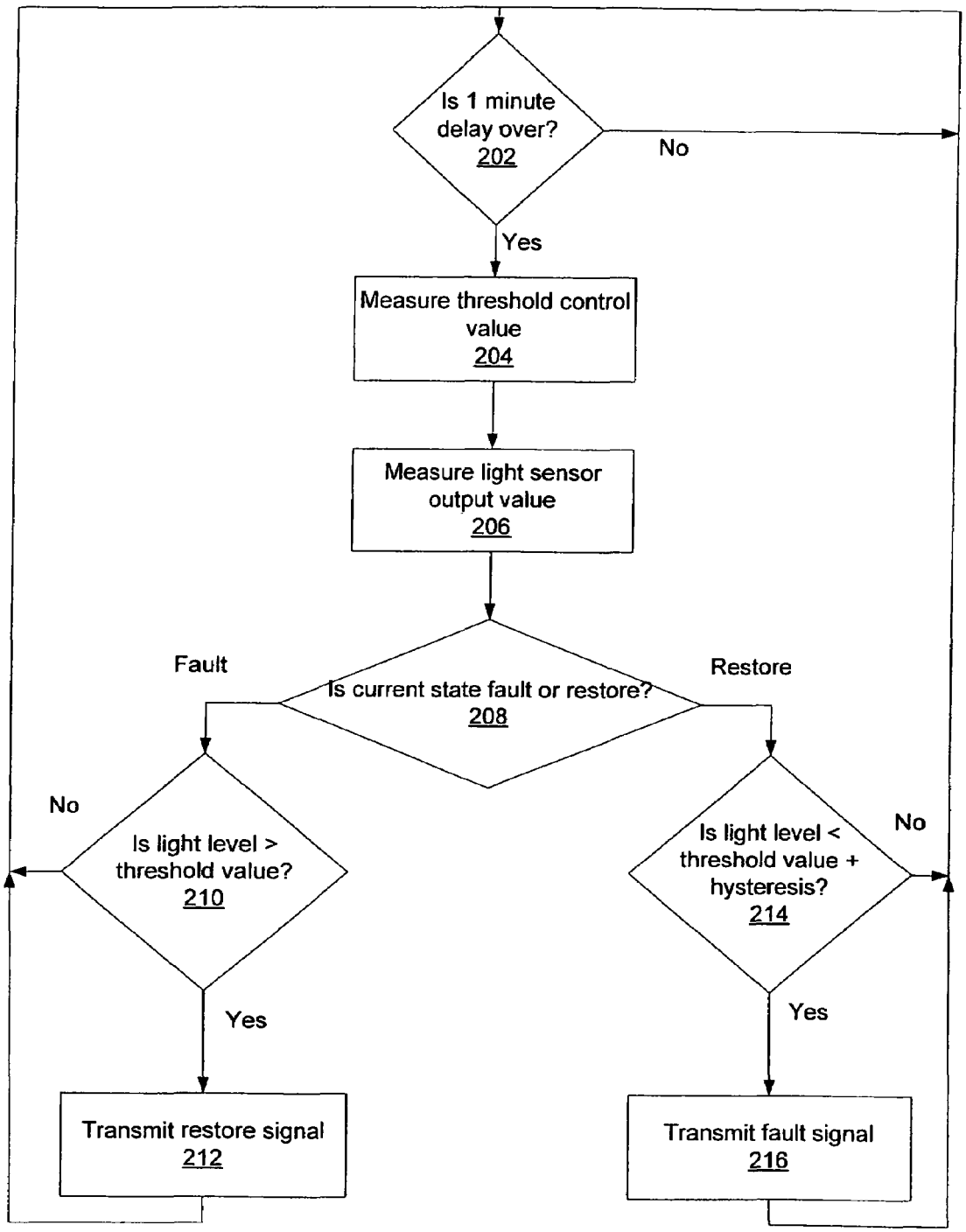
FIG. 2 is a flow diagram of a method that relates to embodiments of the present invention.

FIG. 2 shows a flow diagram of a further embodiment of the present invention that relates to a method of inputting wireless light sensor input to a security system. The method is initiated at step 202, where it is determined if there has been a sufficient time delay between the periodic measurement of the present light level. If it is determined that there has been a sufficient interval between light level measurements, then at step 204 the light level threshold control value is measured. Next, at step 206 the light sensor 102 sensor output light level value is measured. At step 208, depending upon the current system current state of Fault or Restore, a choice is made to enter step 210 or step 214.

At step 210 it is determined if the current light level is greater than the threshold light level value. If it is determined that the light level value is not greater than the threshold value than the method then the method is re-initiated at step 202. If it is determined that the light level value is greater than the threshold light level value, then at step 212, a Restore signal is transmitted from the light sensor 102 to the control panel 104.

At step 214 it is determined if the current light level is less than the threshold light level value plus the value derived from the hysteresis model of the light level. If it is determined that the light level value is greater than the threshold value than the method then the method is re-initiated at step 202. If it is determined that the light level value is less than the threshold light level value plus the hysteresis value, then at step 216, a Fault signal is transmitted from the light sensor 102 to the control panel 104.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed:

1. A system for the wireless light sensor input to a security system, comprising:
   a light detector, wherein the light detector comprises:
   (i) a light detection means for detecting the change of states of light from light to dark and from dark to light;
   (ii) a processor in electrical communication with the light detection means;
   (iii) a wireless transmitter in electrical communication with the processor;
   an alarm control panel in communication with the light detector, wherein the alarm control panel comprises:
   (i) a processor;
   (ii) a receiver in electrical communication with the processor;
   (iii) a power line interface in electrical communication with the processor,
   wherein the power line interface is coupled to a power distribution system;
   at least one remote device controller that is coupled to the power distribution system, the remote device controller being in electrical communication with the alarm control panel via the power distribution system; and
   at least one remote device that is coupled to the power distribution system, the remote device being in electrical communication with the at least one remote device controller via the power distribution system.

2. The system of claim 1, wherein if the light level voltage detected by the light detection means is above a predetermined threshold value, indicative of a dark condition, then the light detection means transmits a restore signal to the alarm control panel.

3. The system of claim 2, wherein if the light detected by the light detection means is below a predetermined threshold value, indicative of a light condition, then the light detection means transmits a fault signal to the alarm control panel.

4. The system of claim 3, wherein upon receiving a fault signal, the alarm control panel transmits a command signal via the power distribution system to the remote device controller to activate the remote device.

5. The system of claim 4, wherein upon receiving the command signal to activate the remote device, the remote device controller transmits an activation signal to the remote device, thereby, activating the remote device.

6. The system of claim 5, wherein upon receiving the restore signal, the alarm control panel transmits a command signal via the power distribution system to the remote device to deactivate the remote device.

7. The system of claim 6, wherein upon receiving the command signal to deactivate the remote device, the remote device controller transmits a deactivation signal to the remote device, thereby, deactivating the remote device.

8. A method for wireless light sensor input to a security system, comprising the steps of:
   determining a light level threshold value;
   receiving a first light level value from a wireless light sensor;
   comparing the first light level value to the light level threshold value plus hysteresis in order to determine if a present light level value is greater than or less than the light level threshold value; and
   transmitting a signal to a remote device in response to the determination of the compared value.

9. The method of claim 8, wherein the step of comparing the first light level value to the light level threshold value in order to determine if the present light level value is greater than or less than the light level threshold value further comprises the step of transmitting a signal to a control panel in response to an outcome of the comparison between the light level threshold value and the first light level value.

10. The method of claim 9, further comprising the step of transmitting a command signal from the control panel to a remote device controller in response to the outcome of the comparison between the light level threshold value and the first light level value.

11. The method of claim 10, wherein the command signal is a restore signal.

12. The method of claim 10, wherein the command signal is a fault signal.

13. The method of claim 11, wherein the step of transmitting a signal to a remote device further comprises the step of deactivating a remote device in response to a restore signal transmitted from the remote device controller.

14. The method of claim 12, wherein the step of transmitting a signal to a remote device further comprises the step of activating a remote device in response to a fault signal transmitted from the remote device controller.

* * * * *